United States Patent
Zibell

[11] Patent Number: 6,061,021
[45] Date of Patent: May 9, 2000

[54] LOCATABLE MOBILE CELLULAR TELEPHONY TERMINAL

[75] Inventor: Laurent Zibell, Paris, France

[73] Assignee: Sagem SA, Paris, France

[21] Appl. No.: 08/955,644

[22] Filed: Oct. 22, 1997

[51] Int. Cl.[7] .................................................. G01S 3/52
[52] U.S. Cl. .............. 342/418; 342/357.05; 342/357.14; 342/457
[58] Field of Search ............................. 342/99, 402, 405, 342/418, 419, 357.05, 357.06, 457, 463, 357.14; 701/220

[56] References Cited

U.S. PATENT DOCUMENTS

| | | |
|---|---|---|
| 3,702,477 | 11/1972 | Brown . |
| 5,504,491 | 4/1996 | Chapman ................................. 342/357 |
| 5,551,059 | 8/1996 | Hutcheson et al. . |
| 5,625,668 | 4/1997 | Loomis et al. ............................ 379/58 |
| 5,706,014 | 1/1998 | Abbasi .................................... 342/357 |
| 5,748,147 | 5/1998 | Bickley et al. .......................... 342/457 |
| 5,906,655 | 5/1999 | Fan .......................................... 701/216 |

FOREIGN PATENT DOCUMENTS

| | | |
|---|---|---|
| 0 715 150 A1 | 11/1994 | European Pat. Off. . |
| 2 264 837 | 2/1993 | United Kingdom . |

Primary Examiner—Thomas H. Tarcza
Assistant Examiner—Dao L. Pham
Attorney, Agent, or Firm—Graham & James LLP

[57] ABSTRACT

The mobile cellular telephony terminal includes a radio transmitter/receiver (1) for communicating with base stations of a cellular network, measuring the Doppler velocity of the transmissions originating from the stations and accordingly operating circuits (2) for estimating the velocity of the terminal, by composition of the Doppler velocities, and updating circuits (4, 5) are provided for updating an inertial unit (10) supplying the radio circuit (1) with the position of the terminal, by comparison between a terminal velocity supplied by the unit (10) and the estimated velocity.

12 Claims, 1 Drawing Sheet

LOCATABLE MOBILE CELLULAR TELEPHONY TERMINAL

FIELD OF THE INVENTION

This invention relates to a mobile cellular telephony terminal comprising radio transmitter/receiver means for communicating with base stations of a cellular network.

BACKGROUND OF THE INVENTION

A mobile cellular telephony terminal allows it user, as he or she travels, to overcome any constraint in receiving or transmitting a telephone call by radio. From time to time, the terminal moves from one radio coverage cell to another adjacent one, and on each occasion it can connect to the base radio station providing radio coverage for the cell in question.

This complete freedom of movement does, however, have the drawback of ruling out any accurate location of an individual in distress, who would be incapable of indicating his or her exact position, while a wirebased telephone network makes such location possible. Although a base radio station can actually indicate to the cellular network operator the presence of a given subscriber in its cell, its area is too wide for this information to be useful.

In order to solve the problem mentioned above, the Applicant Company has contemplated terminal location by triangulation with respect to the base station of the cell and the stations of the neighboring cells, the transmissions from which can be received by the terminal. Measurements of distances to the stations by measuring the time of flight of the waves and/or measurements of azimuthal angles of the reception directions with respect to the stations, the positions of which are known, would in theory make it possible for the terminal to determine its relative position with respect to these known positions and to determine its absolute position therefrom, in order to indicate it to the station of the cell in which it is located. In practice, however, by interfering with the propagation of the radio waves, reflection or diffraction by a variety of obstacles would greatly distort the measurements by which the reception direction is determined, while multiple radio-wave paths would lead to a temporal spread of the theoretical reception time of a wave output by a station and would create an excessive uncertainty on the distance measurement taken on the basis of measuring the time of flight of the radio wave. A satellite radio-positioning receiver, such as GPS (Global Positioning System) would encounter the same problem. In an urban area, large buildings often generate errors of this type, and the solution of determining position by triangulation must therefore be ruled out.

The Applicant Company has also envisaged navigation by reckoning, which is used for vehicles, in which the distance covered at any time is measured using an odometer and, by composition with the heading taken by a magnetometer, a displacement vector used to update a previously calculated position is calculated as travel progresses. The odometer may be replaced by a Doppler radar or a camera which, pointing at the ground, measures the velocity of the image that is recorded. It is not, however, possible to impose a permanent constraint of this type on a pedestrian carrying the terminal, and, in practice, the requisite sensors mentioned above need to be fitted on a vehicle.

Consideration may also be given to inertial navigation, currently used on board aircraft, which affords the carrier of the terminal complete freedom of movement and attitude. Using a triaxial accelerometer and a triaxial gyroscope, an inertial unit calculates the instantaneous velocity vector of the craft in question by integration with respect to time, and an additional integration with respect to time provides the displacement with respect to a defined initial position on the basis of it. However, it is necessary to be able to update cyclically the position which is supplied by the unit and on which the position calculations depend, in order to limit the error which would otherwise increase indefinitely over time.

It is the latter technique of position determination which the Applicant Company has chosen in order to solve the problem of locating a telephony terminal, using means which do not have the above drawbacks and which supply position indications having a limited error.

SUMMARY OF THE INVENTION

To this end, the invention relates to a mobile cellular telephony terminal including radio transmitter/receiver means for communicating with base stations of a cellular network, wherein the radio means are designed to measure the Doppler velocity of the transmissions originating from the stations, and accordingly to operate means for estimating the velocity of the terminal, by composition of the Doppler velocities, and updating means are provided for updating an inertial unit intended to supply the radio means with the position of the terminal, by comparison between a terminal velocity supplied by the unit and the estimated velocity.

Thus, the Doppler velocity with respect to several stations, which is not affected by echoes, supplies at least an indication of the order of magnitude of the modulus of the actual velocity. Specifically, even though the directions from which the transmissions from the stations originate are not determined, since determination of this type would run the risk of being distorted by echoes, the terminal has a set of velocity vector moduli, corresponding respectively to the various stations and indicating the radial velocities of movement with respect to each station, or its image, that is to say the last obstacle affecting the propagation of the wave received by the terminal. Composition of these moduli then makes it possible to obtain the modulus of an estimated velocity vector, to within a scale factor connected with the number of stations. In the ideal case, with simply two moduli corresponding to two orthogonal vectors, and in the absence of echoes, a quadratic composition of the moduli exactly supplies the modulus of the actual velocity. In the general case of several moduli, the largest of them further supplies a certain minimum value of the modulus of the actual velocity.

DESCRIPTION OF THE DRAWINGS

Figure 1:
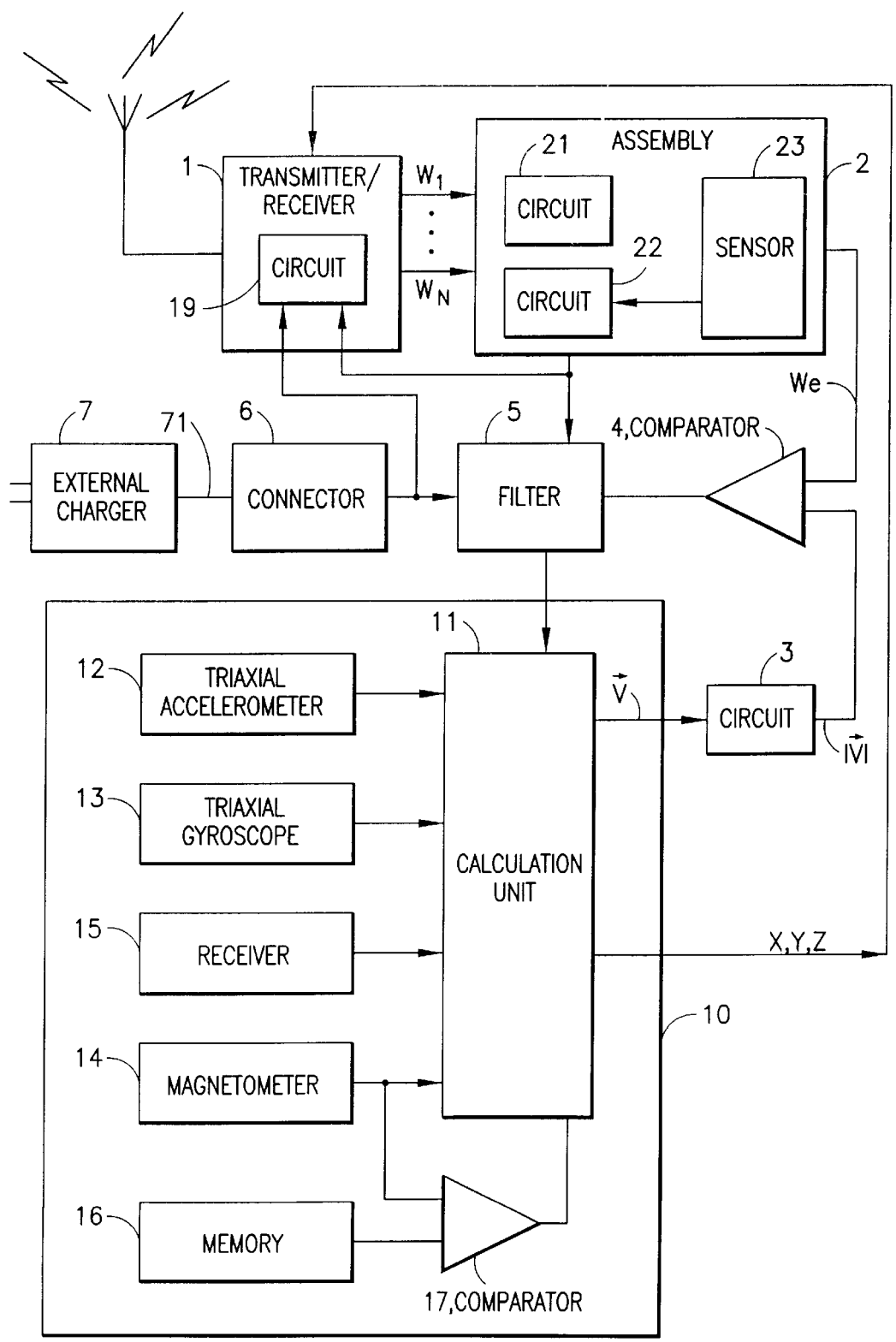
FIG. 1 shows a block diagrammatic representation of a preferred embodiment of the present invention.

The invention will be understood more clearly with the aid of the following description of a preferred embodiment of the terminal of the invention, with reference to the single appended figure which is a block diagrammatic representation. It will be noted that, for the sake of clarity, the conventional telephone part has not been represented.

The terminal which is represented includes a multichannel radio transmitter/receiver 1 which is designed to measure the Doppler velocity of transmissions originating from cellular radio telephony stations and operates an assembly 2 for estimating the velocity of the terminal on the basis of the above measurements. The assembly 2 includes a circuit 21 for calculating an estimated maximum value of the velocity of the terminal, on the basis of the difference between at least two of the Doppler velocities. A circuit 22 in the assembly 2 estimates a Doppler bias model for the transmitter/receiver 1, on the basis of temperature measurements supplied by a sensor 23 which, in this case, is integrated with the assembly 2.

The output of the estimation assembly 2 is connected to a first input of a comparator 4, the second input of which is connected to a circuit 3 supplying the modulus of a terminal velocity vector delivered by a calculation unit 11 of an inertial unit 10 integrated with the terminal. The output of the comparator 4 supplies data to a Kalman filter 5 for updating the inertial unit 10. In this example, the calculation unit 11 receives measurement data delivered by a triaxial accelerometer 12, a triaxial gyroscope 13, a magnetometer 14 and a satellite radio-positioning receiver 15, in this case a GPS receiver. An output of the calculation unit 11, connected to a transmission part of the circuit 1, supplies data relating to the positioning X, Y, Z of the terminal. In this example, the measurements delivered by the magnetometer 14 are, before processing, subjected to a validation test by a comparator 17, in which they are compared with data which are contained in a memory 16 and represent the terrestrial magnetic field.

For production of the inertial unit 10, consideration may, for example, be given to silicon accelerometers and vibrating gyroscopes, optionally integrated to form a complete inertial core of limited volume.

A sensor for detecting zero velocity is also provided in this case, and consists of a battery-charger connector 6 for connection to a fixed external charger 7 of a battery (not shown) of the terminal. An end connector (not shown) of an output flex 71 of the charger 7 interacts with the connector 6 in order to charge the battery. The connector 6 also has a contact (not shown) for detecting the presence of the connector of the flex 71, which contact supplies the corresponding indication to a Doppler adjustment circuit 19, which forms part of the circuit 1, and to the Kalman filter 5.

The mode of operation of the terminal which has been represented will now be explained.

When the individual carrying the terminal travels, the terminal moves from one radio coverage cell to another and can, in conventional fashion, establish a two-way radio link with the corresponding base station, on a defined channel. However, the terminal can also receive, albeit with a weaker signal, the transmissions from N-1 other stations in neighboring cells, on different channels. For each of the receptions in each channel, the radio circuit 1 cyclically determines the instantaneous frequency of the wave which is received and, given knowledge of the propagation velocity of the radio waves in air, it deduces therefrom a value Wi of the modulus of the Doppler velocity of the terminal relative to each station transmission i (i=1 to N).

The estimation assembly 2 cyclically performs a composition of the estimated Doppler velocity values in order to determine an estimated value of the velocity of the terminal. In this example, the composition is a quadratic composition of the Doppler velocities, which is to say the directions of arrival of the transmissions from the stations, possibly after diffraction or reflection, are here assumed to be mutually independent and therefore statistically orthogonal. Put another way, it may be assumed that the average inclination of the velocity vector with respect to the direction of arrival of the waves is 45°. The modulus of the estimated velocity is of the form:

$$We = (W1^2 + \ldots + WN^2)^{0.5}/K$$

K being a coefficient which increases with N in order to accommodate variations in N and thus normalize the calculated value. However, it would also have been possible to adopt only a fixed number of stations, in which case the coefficient K would then be a constant.

The inertial unit 10 cyclically supplies the position X, Y, Z established on the basis of the data which are output by the sensors 12 and 13 and are reinforced by the data relating to the direction of magnetic north from the magnetometer 14 which is provided in this example. These direction data are validated by the comparator 17 only when the vector which they represent actually corresponds just to the terrestrial magnetic field. To this end, the stored data (16) represent an ellipsoid on which the end of the terrestrial magnetic field vector should lie in the absence of any superposed stray field. The comparator 17 validates the direction data when the end of the vector which they represent deviates from the surface of the ellipsoid only by a distance less than a tolerable error threshold. It would have been possible to provide only a sub-set of the ellipsoid, for example one or more ellipses. The function of the GPS receiver 15 is to supply an initial position for updating the calculation unit 11, when there is no risk of any obstacle interfering with the propagation of the waves originating from the GPS satellites.

The position X, Y, Z which is supplied by the calculation unit 11 and is transmitted by radio to the station of the cell in which the terminal is situated, is established by double integration with respect to time of the accelerations measured by the accelerometer 12, and on the basis of the terminal attitude determined by the gyroscope 13. For this position calculation, the unit 11 uses the first integration to determine, as an intermediate, the components along three orthogonal axes of a velocity vector $\vec{V}$ of the terminal. It is the modulus of this velocity vector which will receive the update correction established by measuring the Doppler velocity. The position X, Y, Z obtained by integrating the velocity $\vec{V}$ supplied by the unit 10 is thus corrected.

In order to do this, the comparator 4 supplies the Kalman filter 5 with correction data, or more precisely error data, representing the difference between the velocity modulus We resulting from the Doppler velocity measurements and the modulus of the velocity which is calculated by the unit 10 and supplied through the circuit 3.

It will be recalled that a Kalman filter, well-known to the person skilled in the art, is a calculation unit which makes it possible to model various sensors, that is to say in particular, to progressively ascertain their scale error and bias and correct them in the measurements which are supplied. In other words, the position determined by the unit 10 is subject to error in proportions which are initially unknown and cannot therefore be corrected, as a result of the various deficiencies of the sensors 12 to 14. By comparison between the calculation results of the unit 10 and corresponding results delivered by other means (2), the Kalman filter 5 establishes and, over time, refines a model of the errors of each sensor 12 to 14, that is to say it determines the contribution of each type of error in the total calculation error, so as to try to minimize the discrepancies which are found and thus update the unit 10.

The Kalman filter 5 therefore in this case corrects the measurements from the sensors 12 to 14 in order to minimize the series of velocity errors supplied cyclically by the comparator 4. It will be noted that the successive corrections of the model of each sensor 12 to 14 makes it possible, on each occasion, to determine the previous residual errors and correct them, so that there is no build-up of errors in the position calculation by the unit 11. Although the velocity correction relates only to the modulus, and not to the direction, a succession of corrections of the velocity modulus for a direction of movement which changes actually supplies non-colinear corrections, that it to say an update along all three motion reference axes of the unit 10.

In the case when all the Doppler velocities which are measured are zero, the estimated velocity is therefore zero. In a particular case in which, through an unfortunate combination of circumstances, echoes realign all the reception directions, and in which the terminal is actually moving at right angles to this unique reception direction, the above estimation would be wrong. However, the likelihood of such a case decreases as the number N of stations increases. Further, a situation of this type would disappear fairly quickly as the direction of movement of the terminal changes, and a delay, while awaiting confirmation by subsequent measurements, in the correction to be carried out would make it possible to avoid premature correction. Further, a premature correction which has been carried out can still be corrected by a subsequent measurement, and can further be deferred if its amplitude seems to be exceptional.

When the terminal is being charged on the fixed charger 7, the detection contact (6) initiates the Doppler adjustment for all the reception channels, that is to say the frequencies then received are assumed to be free of Doppler shift and are stored for reference by the circuit 19. The circuit 2 therefore supplies a zero estimated value. Provision may be made for the control signal output by the contact 6 to be applied to the Kalman filter 5 as well, in order to indicate to it that the zero value is one which is correct and not simply estimated. In the series of errors which are received, the Kalman filter 5 can then safely favor, that is to say pay more attention to, the errors corresponding to a zero velocity when it determines the corrections to be made to the models, at the cost of only partially correcting errors which are not actually certain to be errors since they will have been established by estimation (2).

One example, amongst others, of a zero-velocity sensor which may be envisaged is a moving metal mass which modifies a field or electric current when it moves.

In other examples, the composition of the velocity moduli which was indicated above may also be performed other than quadratically. It is basically an estimation which can be refined when additional information becomes available. In particular, within a cell, knowledge of the reliefs which form an obstacle and the arrangement of the other stations makes it possible to create a statistical model of the reception directions at the terminal and thus to perform a composition of the moduli which is closer to reality.

The circuits 21 to 23 make it possible to improve the precision of the velocity estimates by the assembly 2, by eliminating the frequency bias which may interfere with reception by the radio circuit 1. A bias of this type is due to the drift of a single oscillator in the radio circuit 19 which is used to detect all the Doppler frequencies of the various channels. The principle for detecting, and eliminating, the bias mentioned above is based on the fact that a bias of this type is equivalent to a spurious velocity vector, in common mode, which combines vectorially with each of the actual velocity vectors, that is to say its modulus is here added to or subtracted from the modulus of the Doppler velocity component which is detected. For this reason, the measurements of the Doppler velocities, which are normally a priori mutually independent because they correspond to statistically independent directions, then exhibit some degree of coherence, or dependence, when the common-mode bias is present. Estimation of this coherence makes it possible to deduce an estimation of the bias therefrom, and therefore correct it. In the extreme case of several (at least two) Doppler measurements which are all substantially equal, it can be assumed that it is highly likely that the actual velocity is in fact close to zero and that a frequency bias is therefore involved. The likelihood, mentioned further above, that coincident reception directions are actually the underlying reason, is in fact very small and transitory, and decreases as the number of reception directions increases.

The circuit 21 thus estimates an upper limit on the modulus of the velocity on the basis of the difference between at least two Doppler velocities, which eliminates the common-mode effect of the frequency drift or bias of the oscillator mentioned above.

When there are at least three channels, the circuit 21 performs a composition, for example a quadratic composition, of the differences between each Doppler frequency and all the others, in order to supply an estimation of the upper limit on the modulus of the velocity. It also calculates therefrom a most likely velocity (independent directions) in order, by taking the difference between it and the velocities which are measured, to deduce an estimation of the frequency bias therefrom.

The circuit 22 performs a correlation between the set of biases which are determined in this way and at least one parameter affecting the amplitude of the bias, here temperature (23). It establishes a bias model used to correct the estimated values We. If other variables need to be taken into account as well, for example fluctuations in the supply voltage of the terminal, a Kalman filter is quite appropriate for this purpose. In this example, a physical correction of the bias is implemented by standardizing feedback from the assembly 2 to the adjustment circuit 19. Similarly, corresponding correction information is supplied to the Kalman filter 5 by the assembly 2, for downstream logical correction. In the case of a zero velocity (the velocity moduli in the various channels being equal), this information is therefore treated as being an absolutely reliable measurement, as in the case of the contact 6.

What is claimed is:

1. A mobile cellular telephony terminal including radio transmitter/receiver means (1) for communicating with base stations of a cellular network, wherein the radio means (1) are designed to measure the Doppler velocity of the transmissions originating from the stations, and accordingly to operate means (2) for estimating the velocity of the terminal, by composition of the Doppler velocities, and the updating means (4, 5) are provided for updating an inertial unit (10) intended to supply the radio means (1) with the position of the terminal, by comparison between a terminal velocity supplied by the unit (10) and the estimated velocity.

2. The terminal as claimed in claim 1, in which the velocity estimation means (2) are designed to perform a quadratic composition of the Doppler velocities.

3. The terminal as claimed in claim 1, in which the velocity estimation means (2) include means (21) for calculating an upper limit value on the modulus of the velocity on the basis of the difference between at least two Doppler velocities.

4. The terminal as claimed in claim 1, in which the velocity estimation means include a sensor (6) for detecting zero velocity.

5. The terminal as claimed in claim 4, in which the sensor (6) is designed to detect the connection of the terminal to a fixed charger (7).

6. The terminal as claimed in claim 3, in which the velocity estimation means (2) are designed (22, 23) to estimate a Doppler bias model for the radio means (1) on the basis of temperature measurements supplied by a sensor (23).

7. The terminal as claimed in claim 3, in which the radio means (1) include Doppler adjustment means (19) operated by the velocity estimation means (21, 22; 6).

8. The terminal as claimed in claim 1, in which the updating means include a Kalman filter (5).

9. The terminal as claimed in claim 8, in which the Kalman filter (5) is designed to be operated by the velocity estimation means (21, 22; 6).

10. The terminal as claimed in claim 1, in which the inertial unit (10) includes a magnetometer (14).

11. The terminal as claimed in claim 10, in which means (16, 17) are provided for comparing the measurements of the magnetometer (14) and stored data representing the terrestrial magnetic field, in order to validate said measurements.

12. The terminal as claimed in claim 1, in which a satellite radio-positioning receiver (15) is provided for updating the inertial unit (10).

* * * * *